May 7, 1929.   H. D. COLMAN   1,712,256
GEAR CUTTING MACHINE
Original Filed Aug. 8, 1924   18 Sheets-Sheet 7

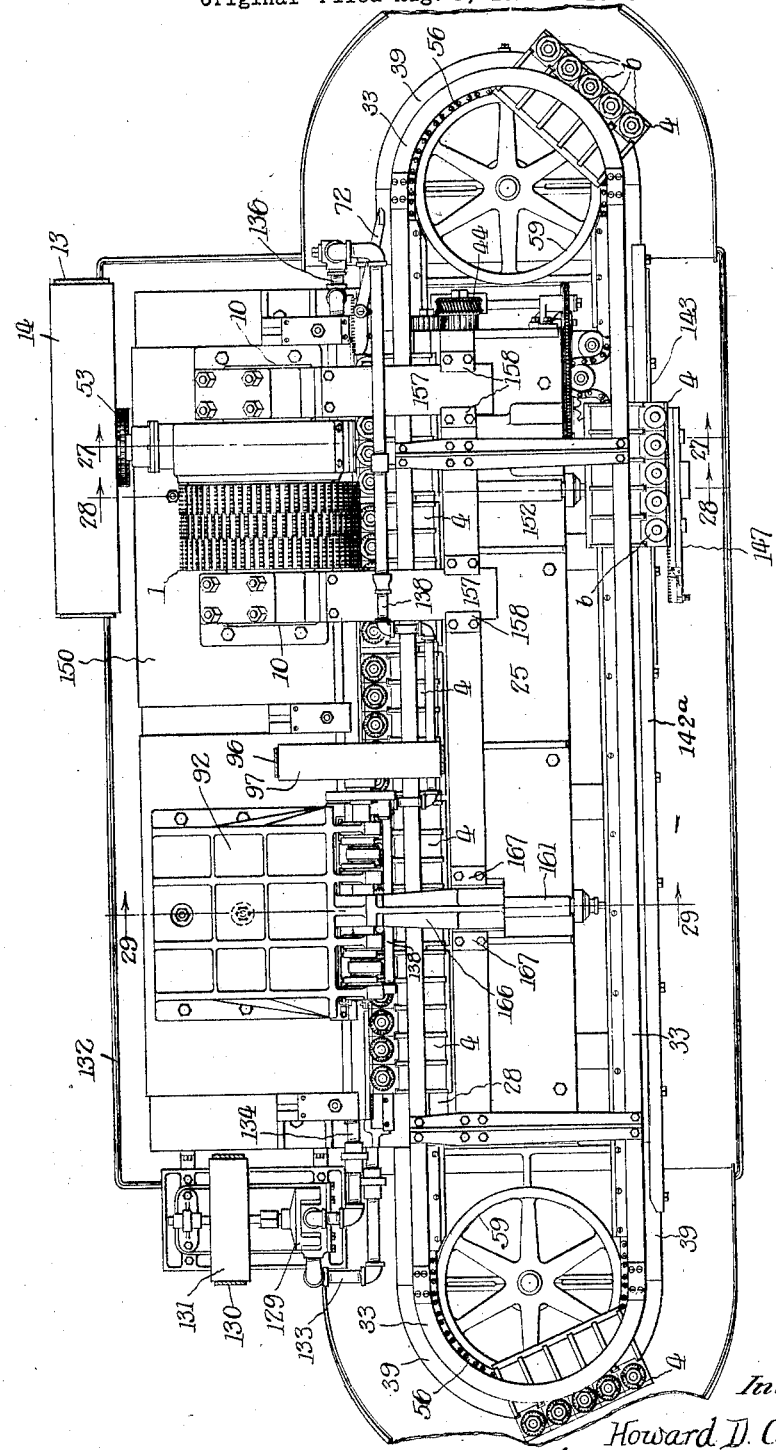

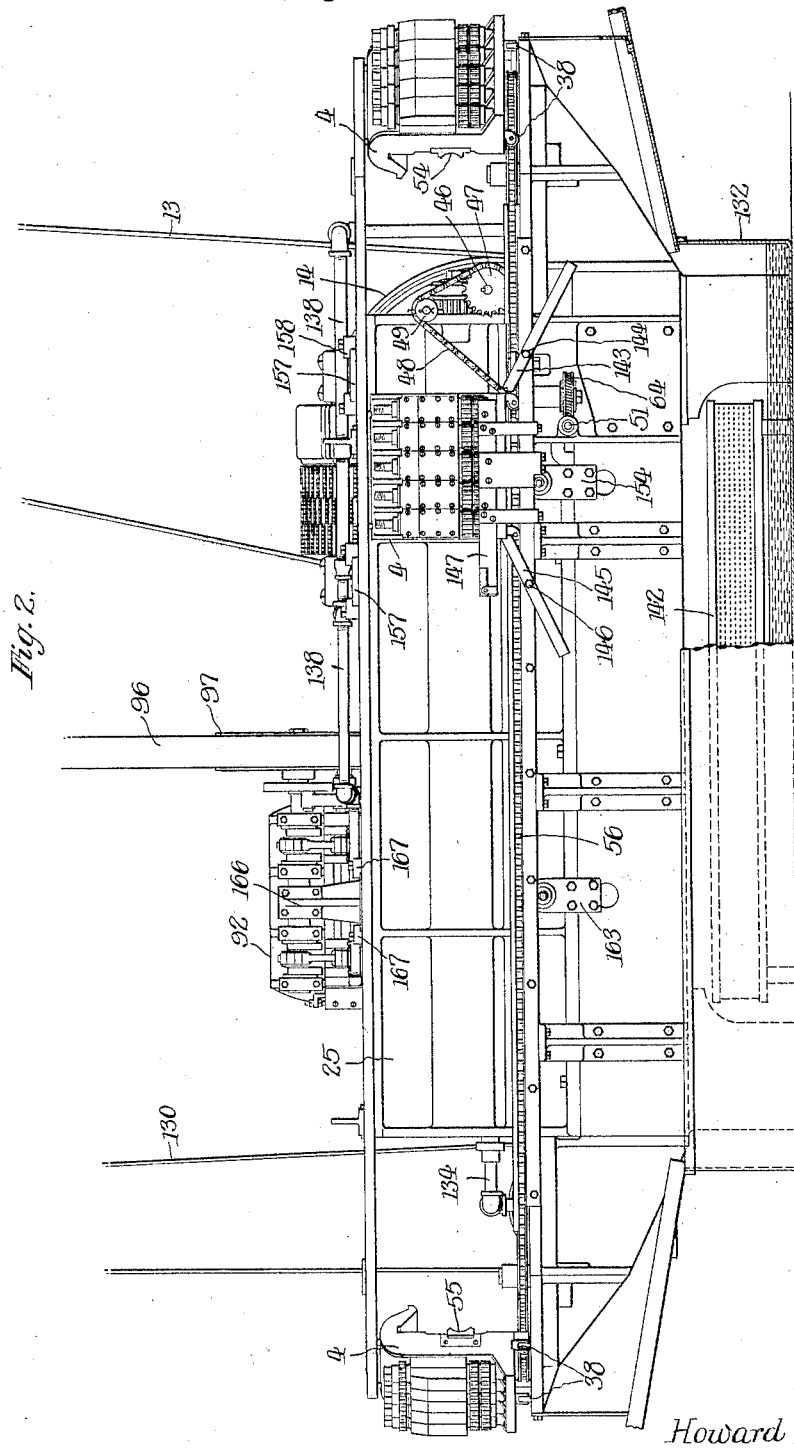

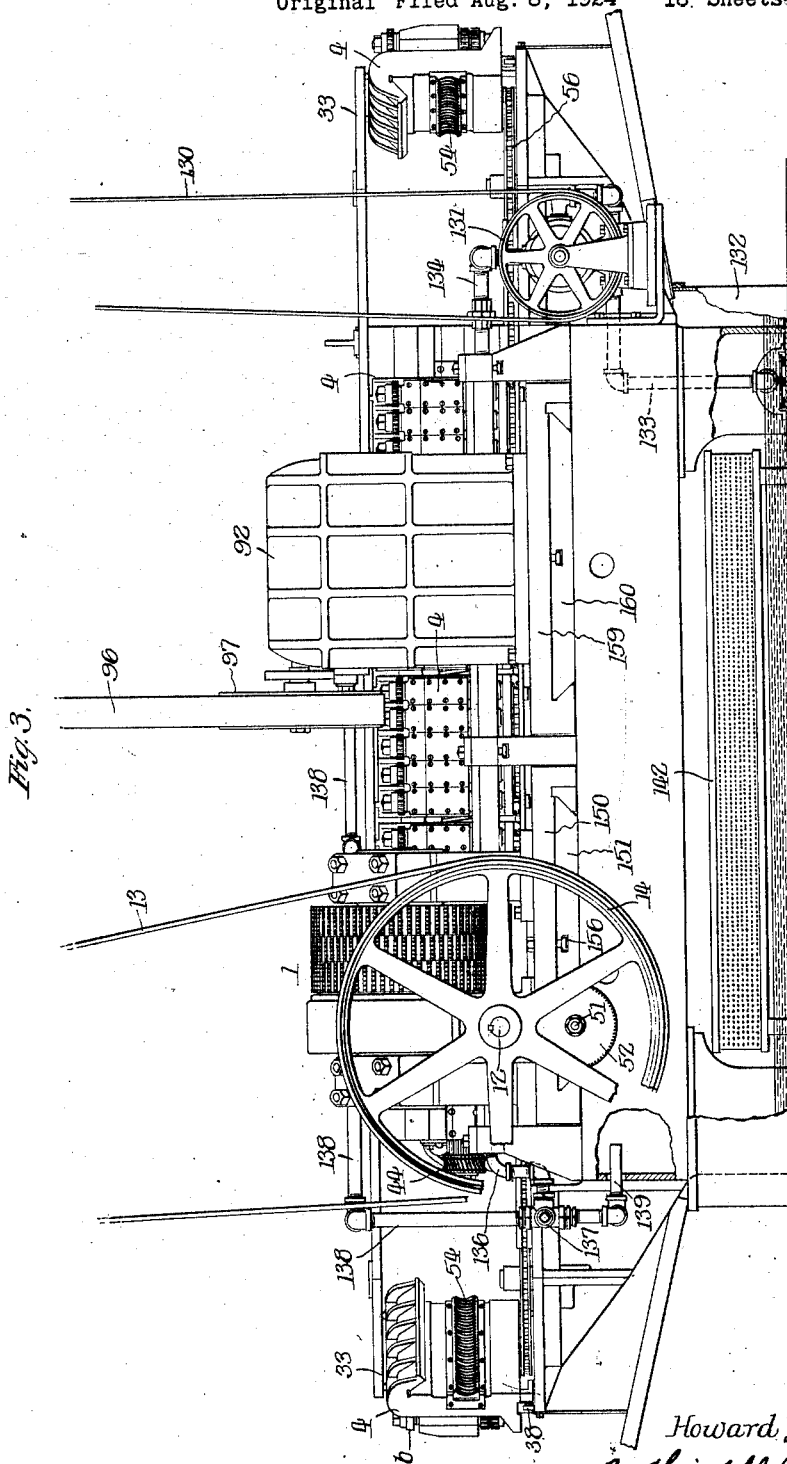

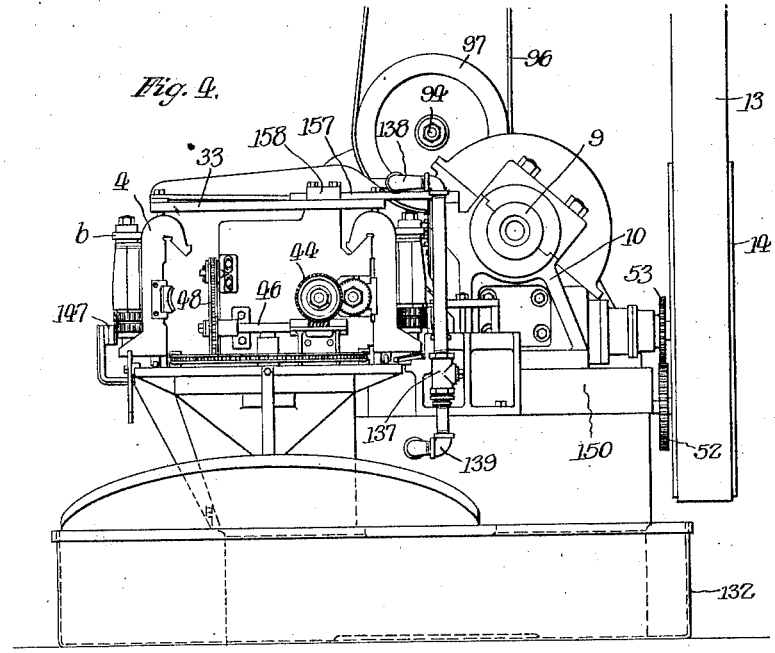
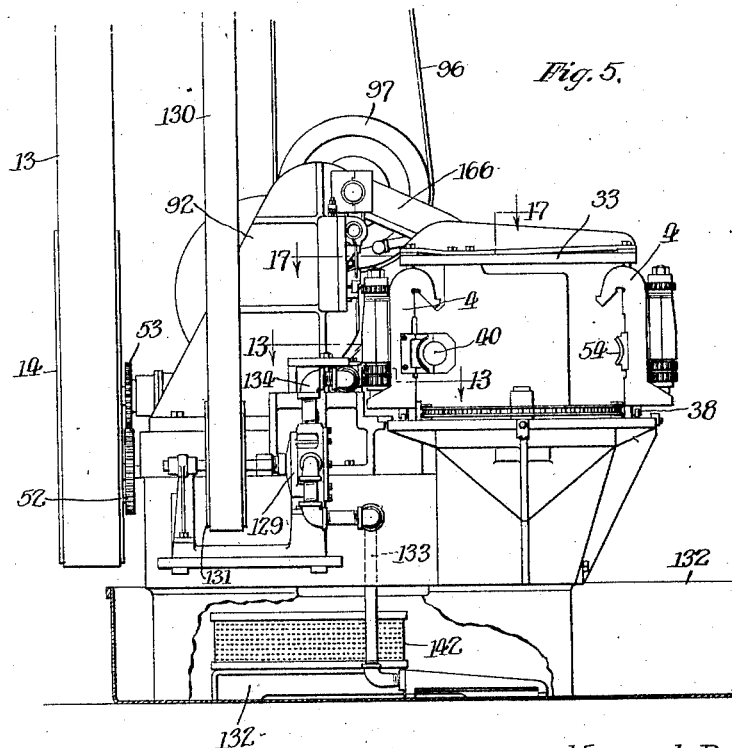

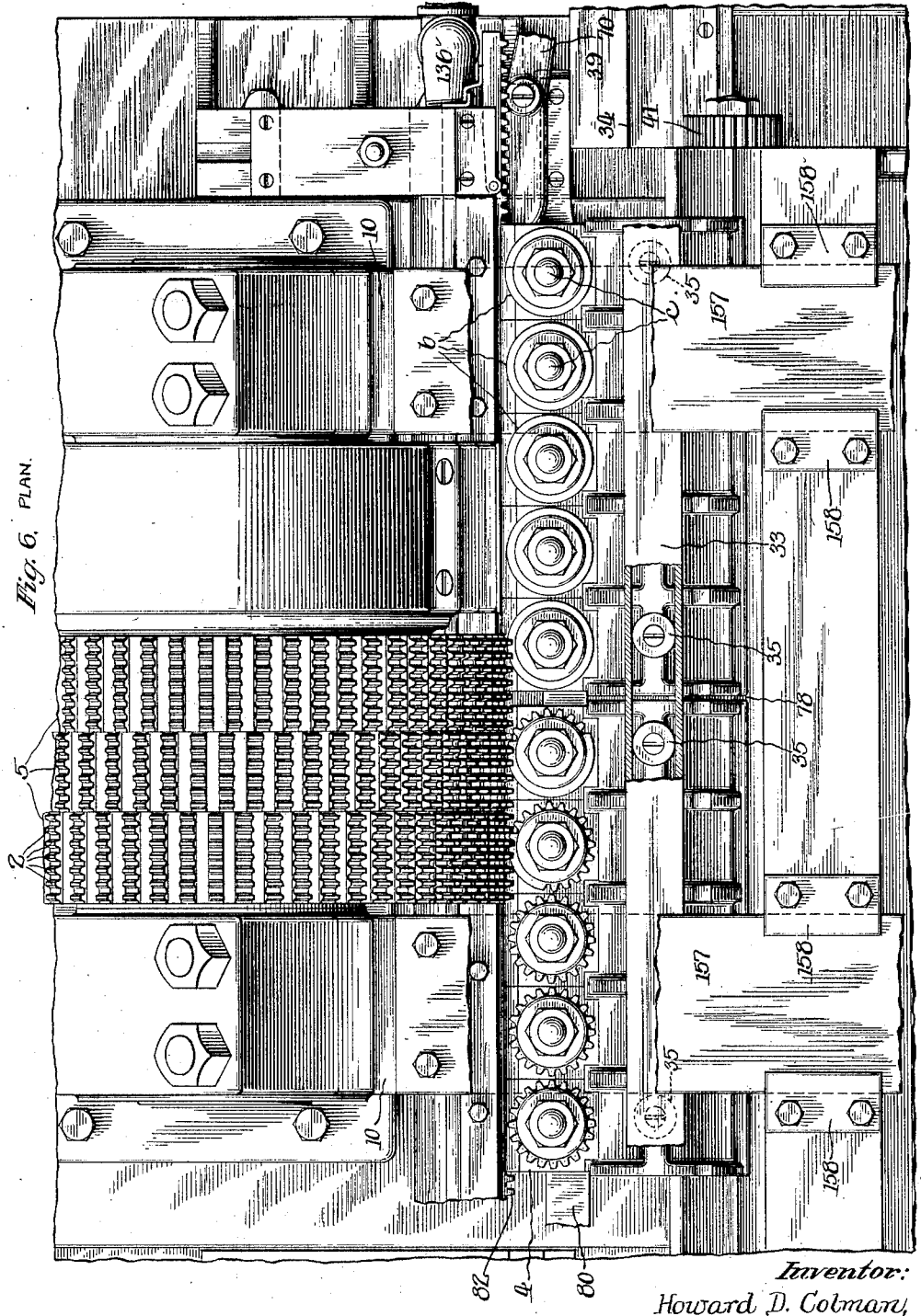

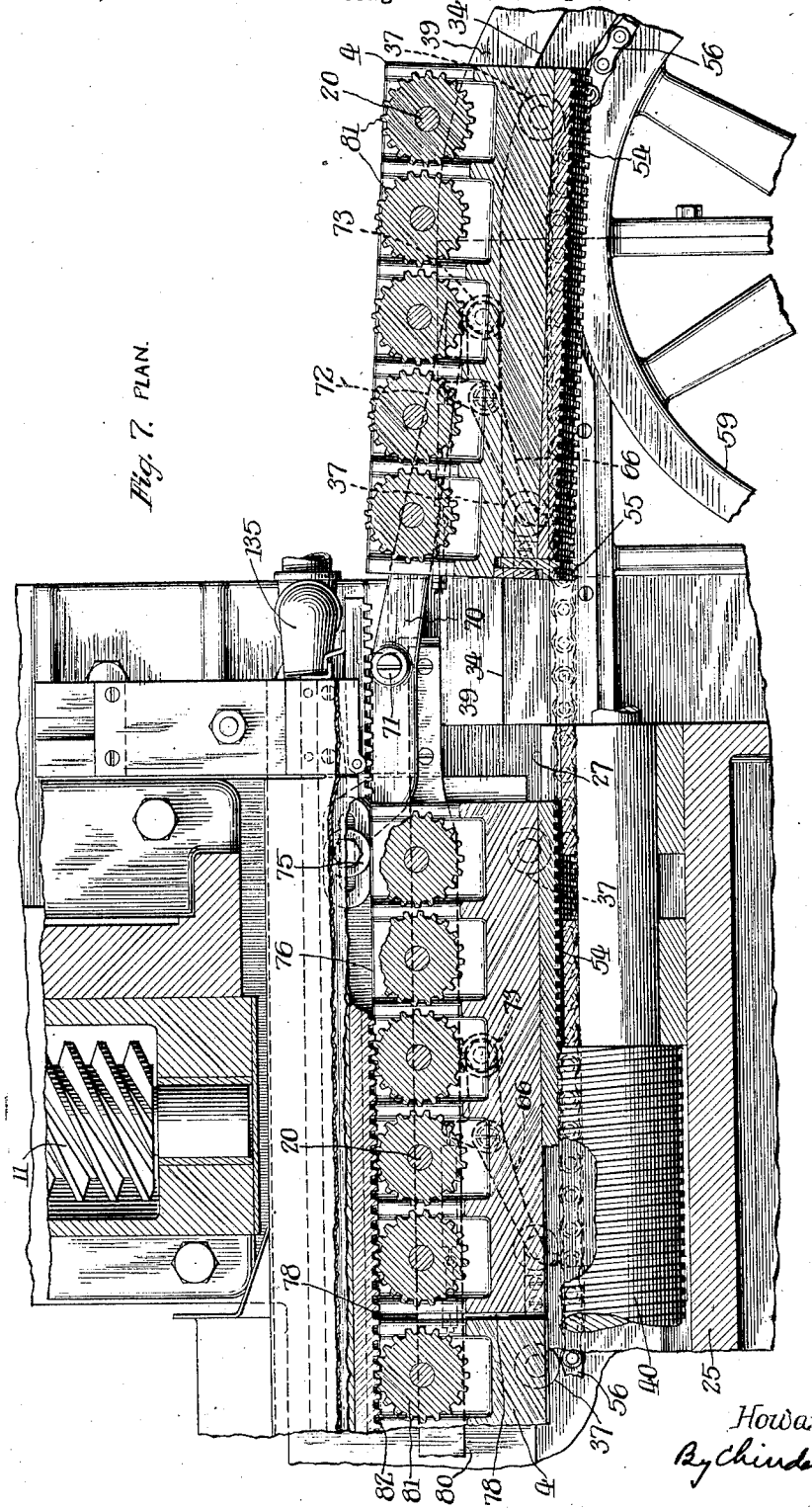

Inventor
Howard D. Colman,
By Churchill Parker Carlson
Attys.

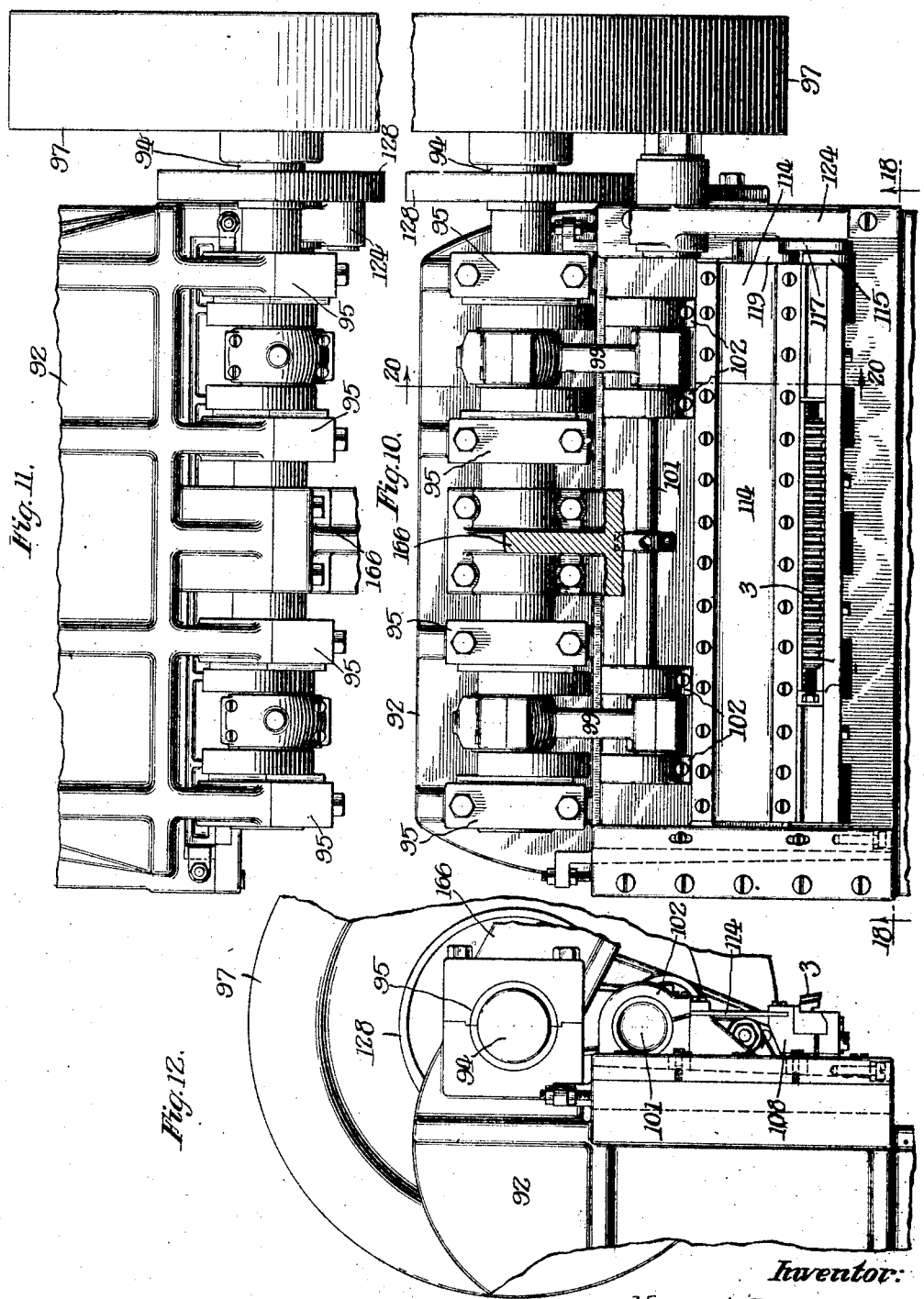

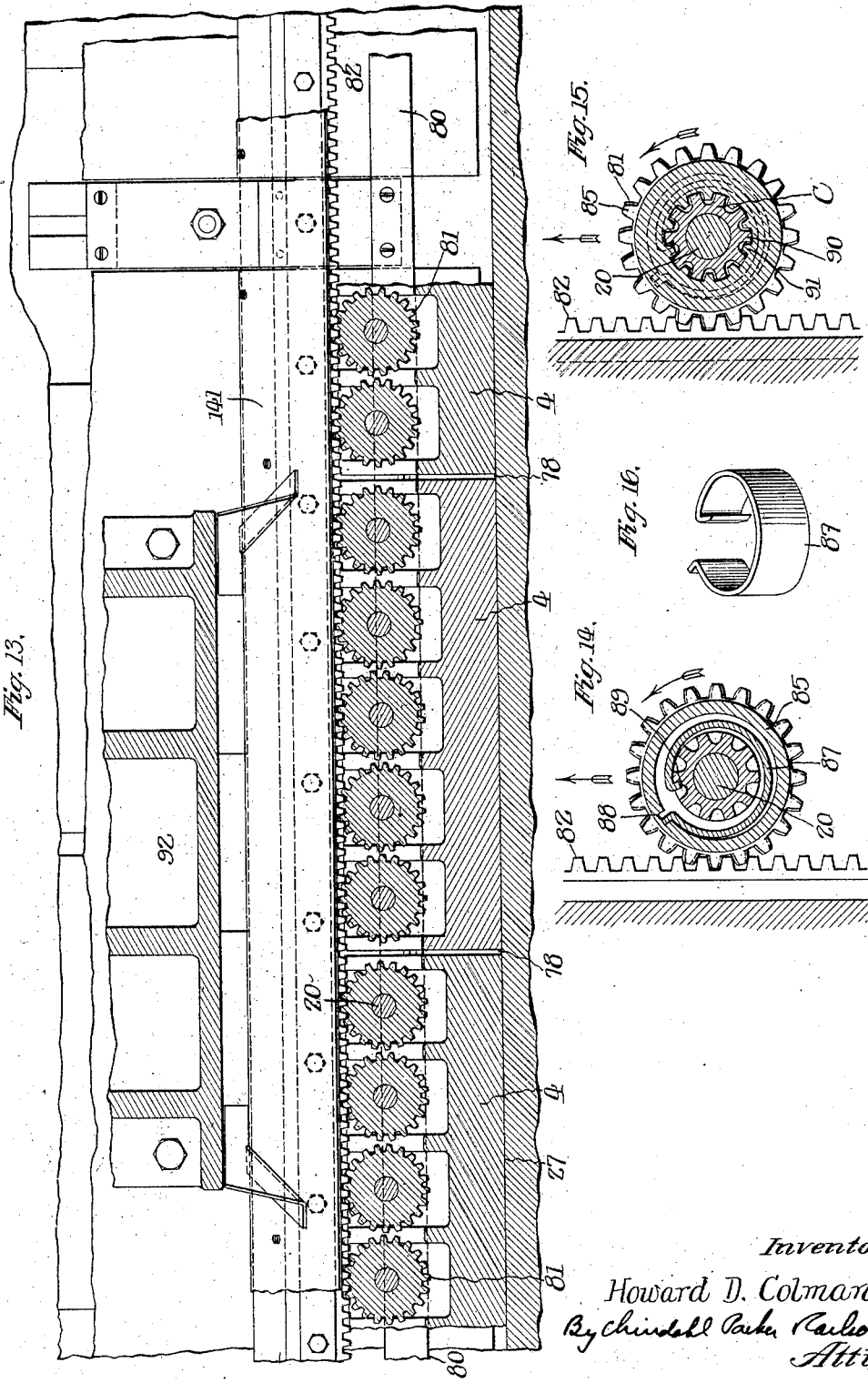

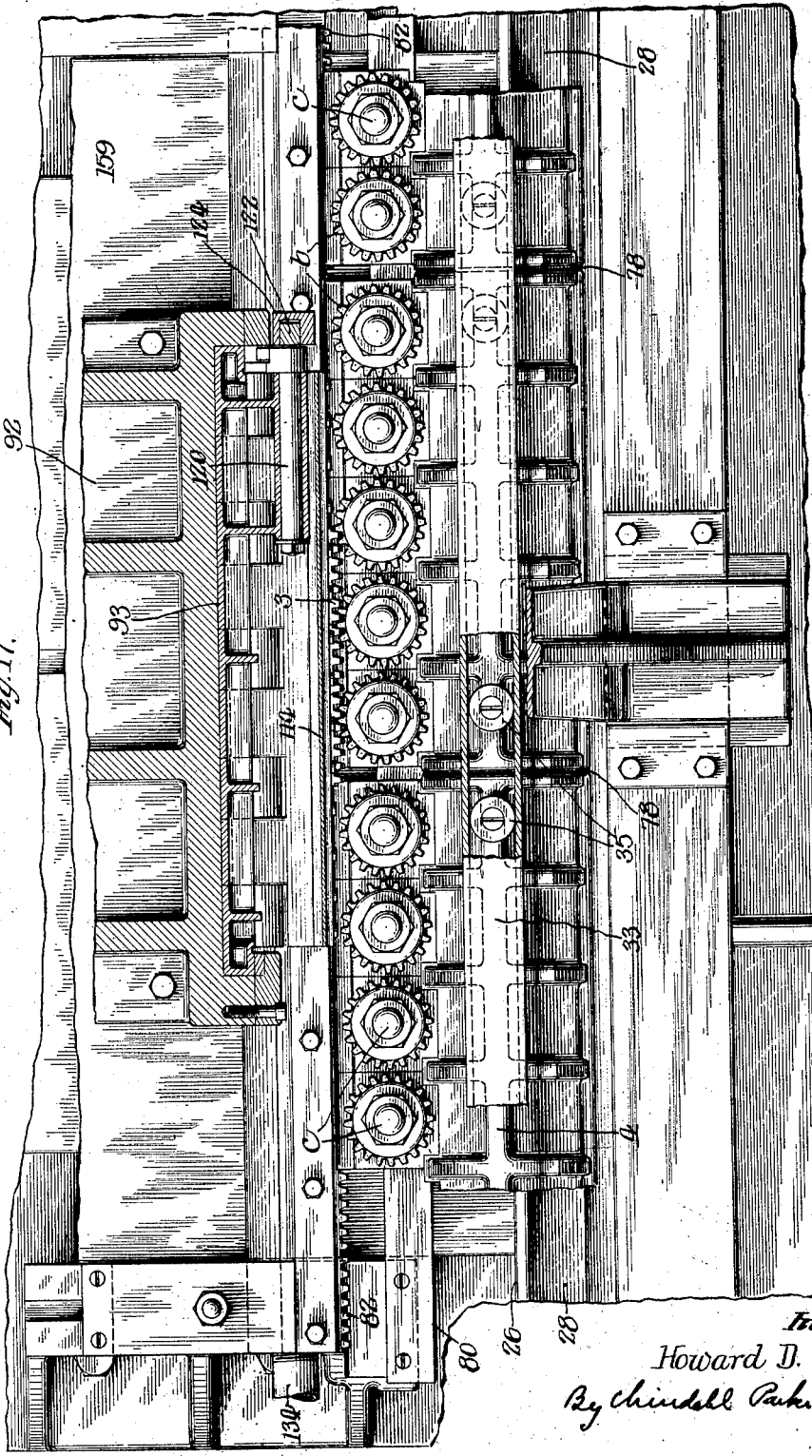

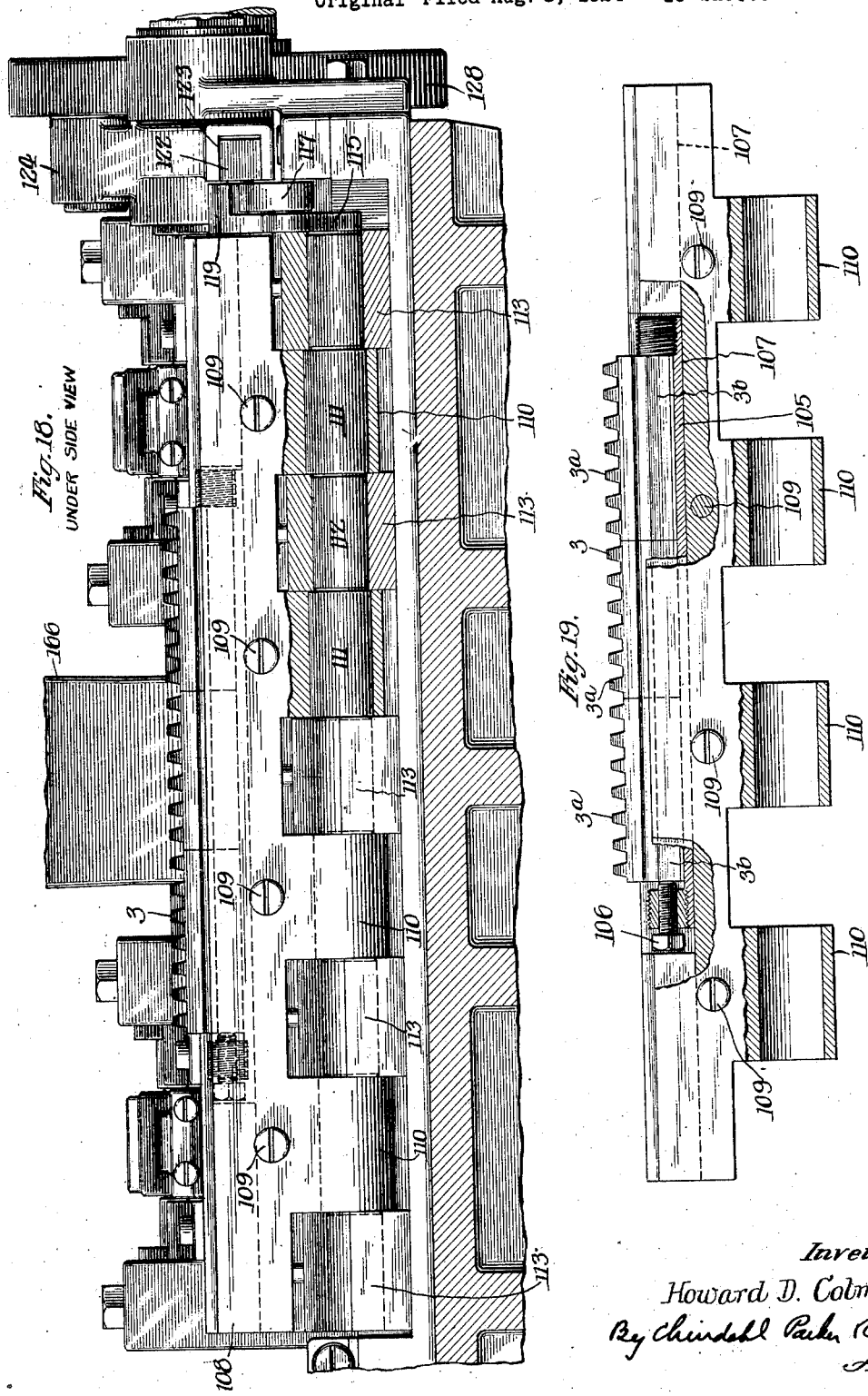

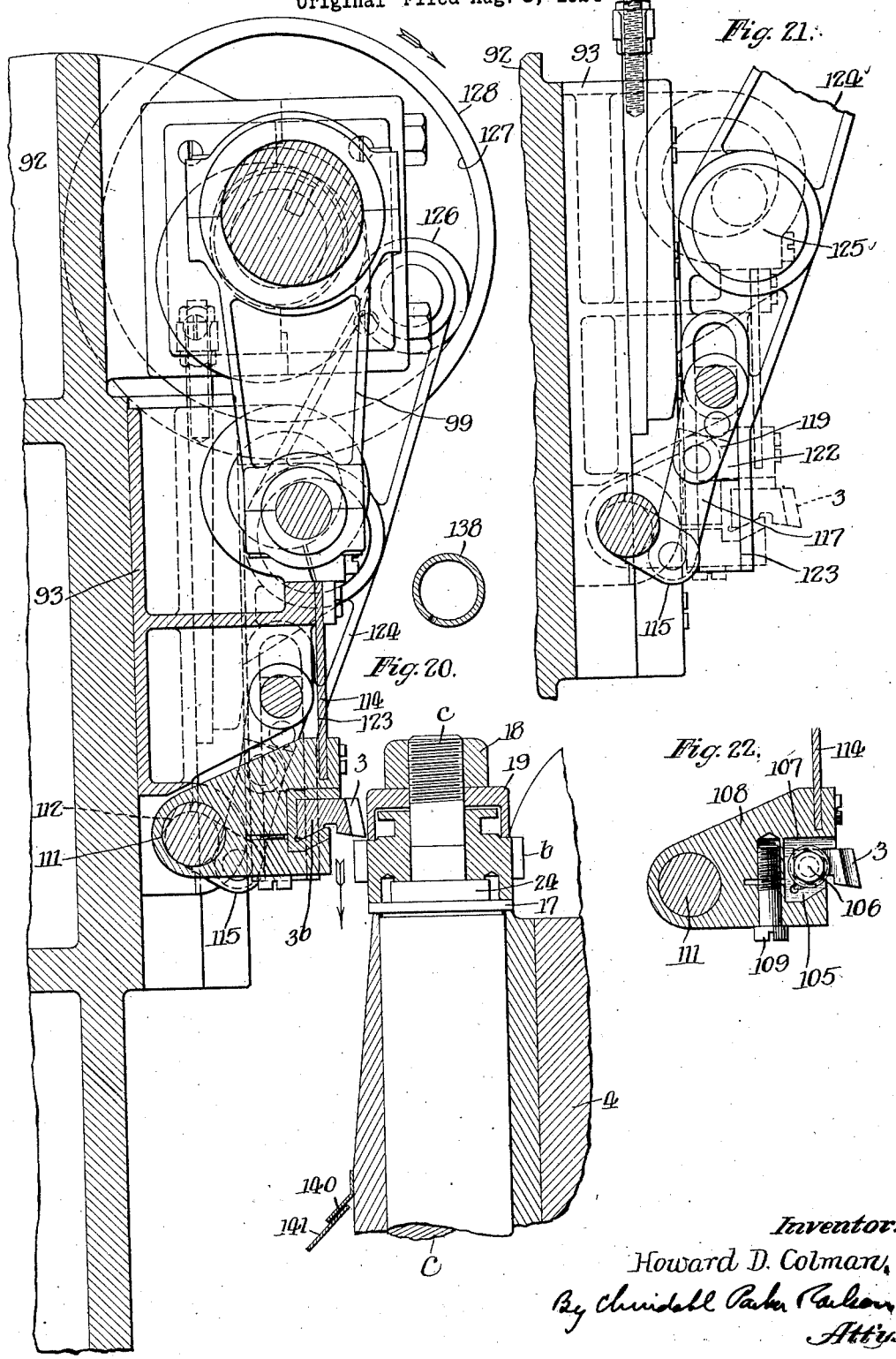

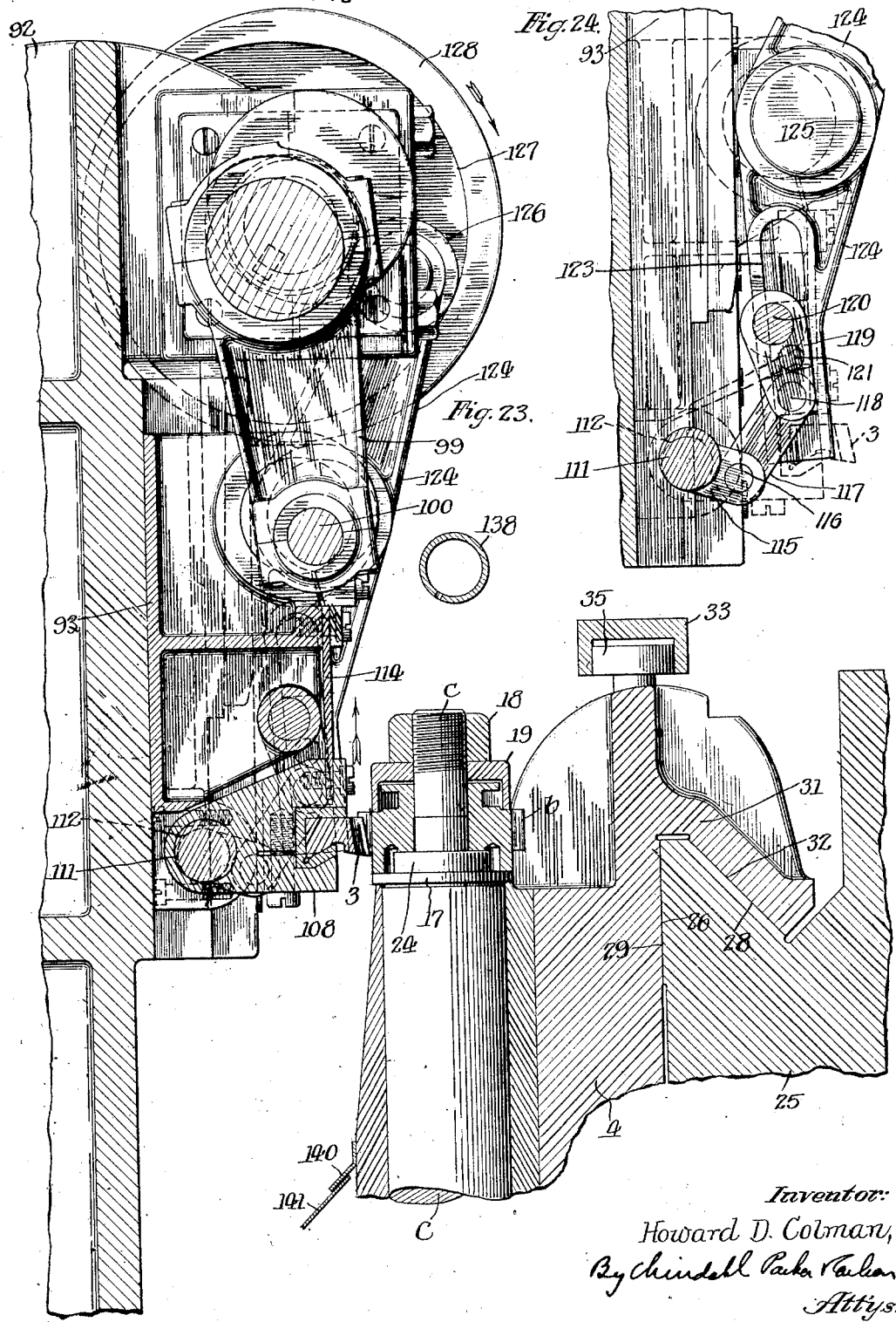

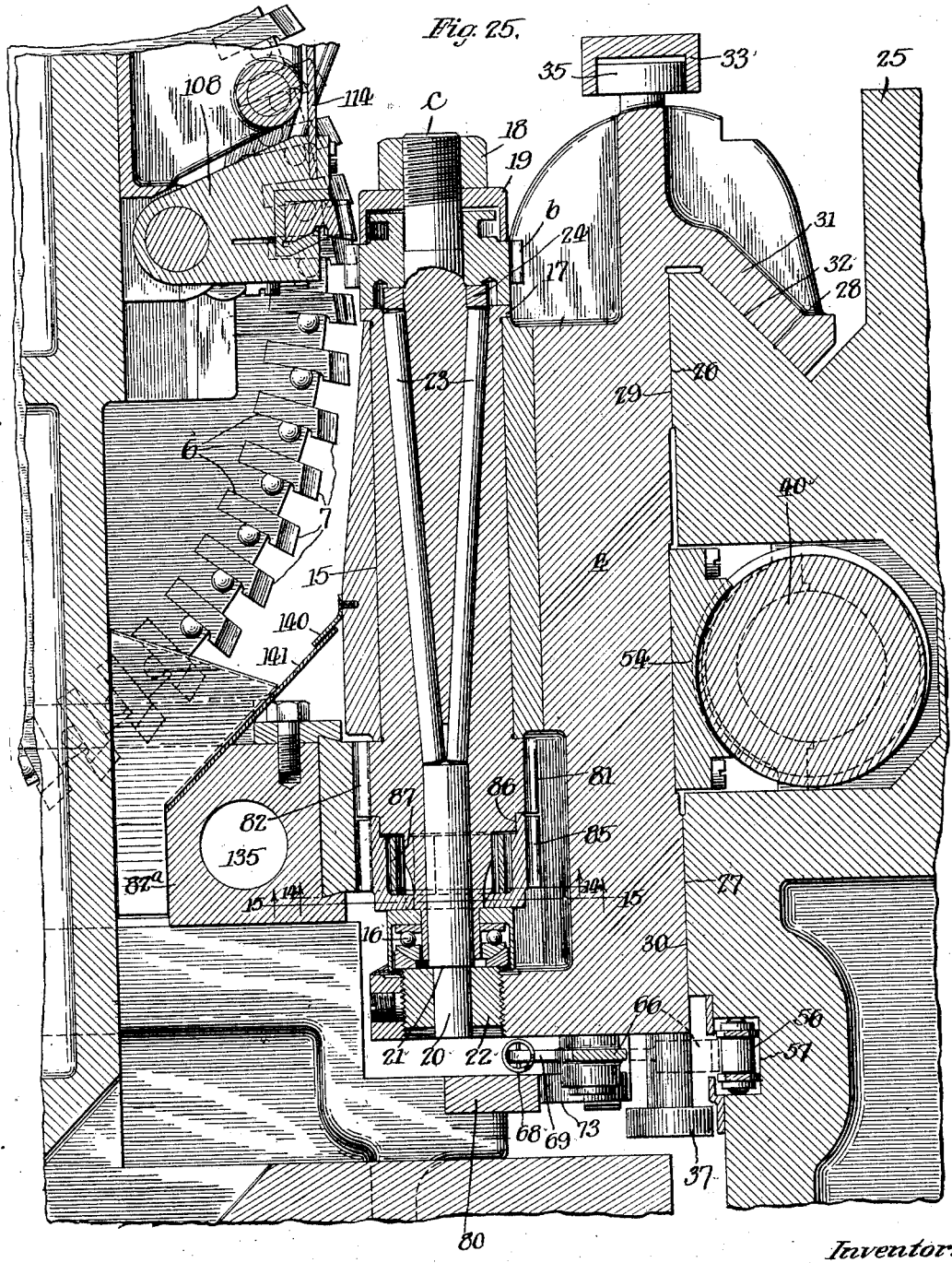

May 7, 1929.  H. D. COLMAN  1,712,256
GEAR CUTTING MACHINE
Original Filed Aug. 8, 1924    18 Sheets-Sheet 15
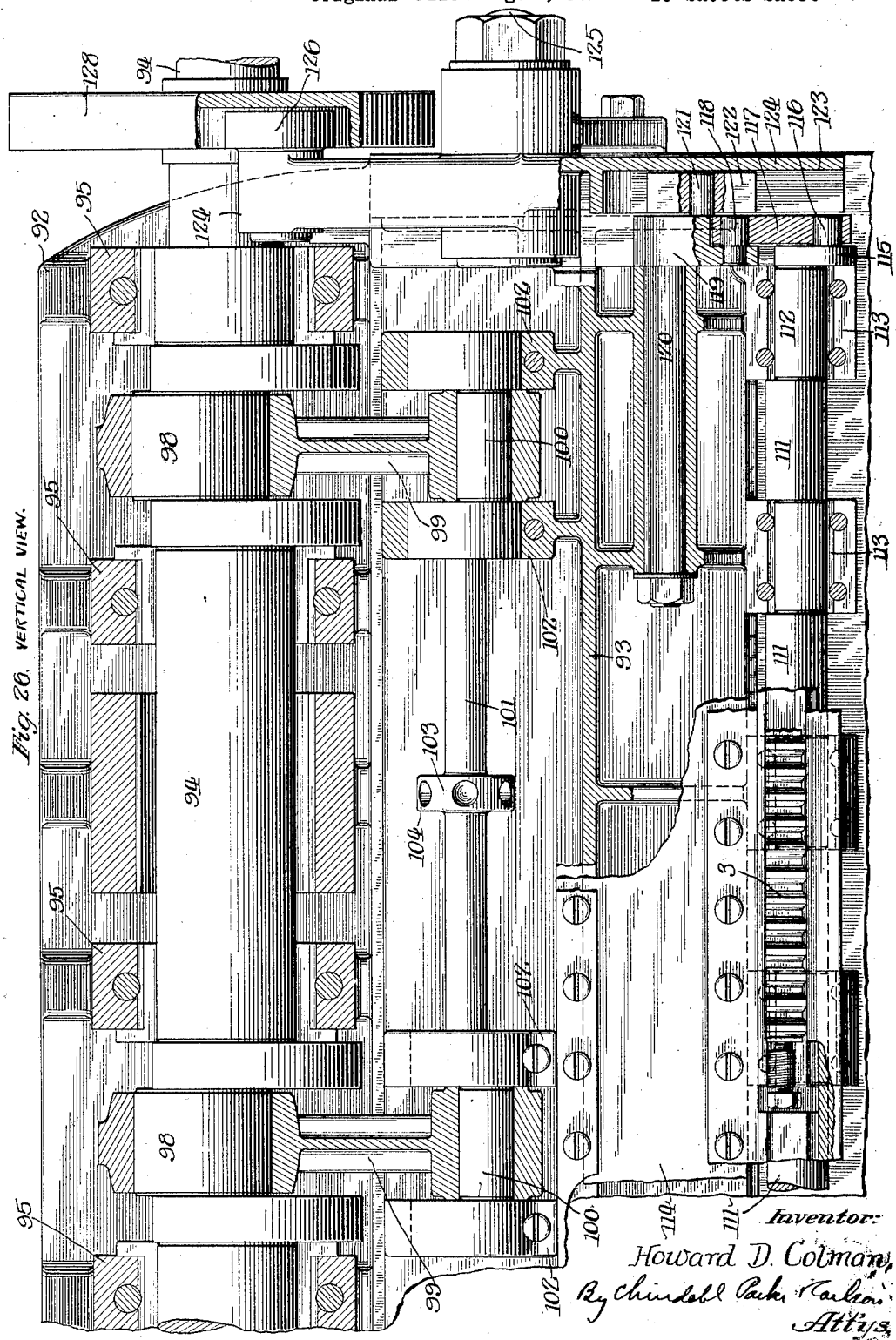
Inventor:
Howard D. Colman,
By Churchill Park Carlson
Attys.

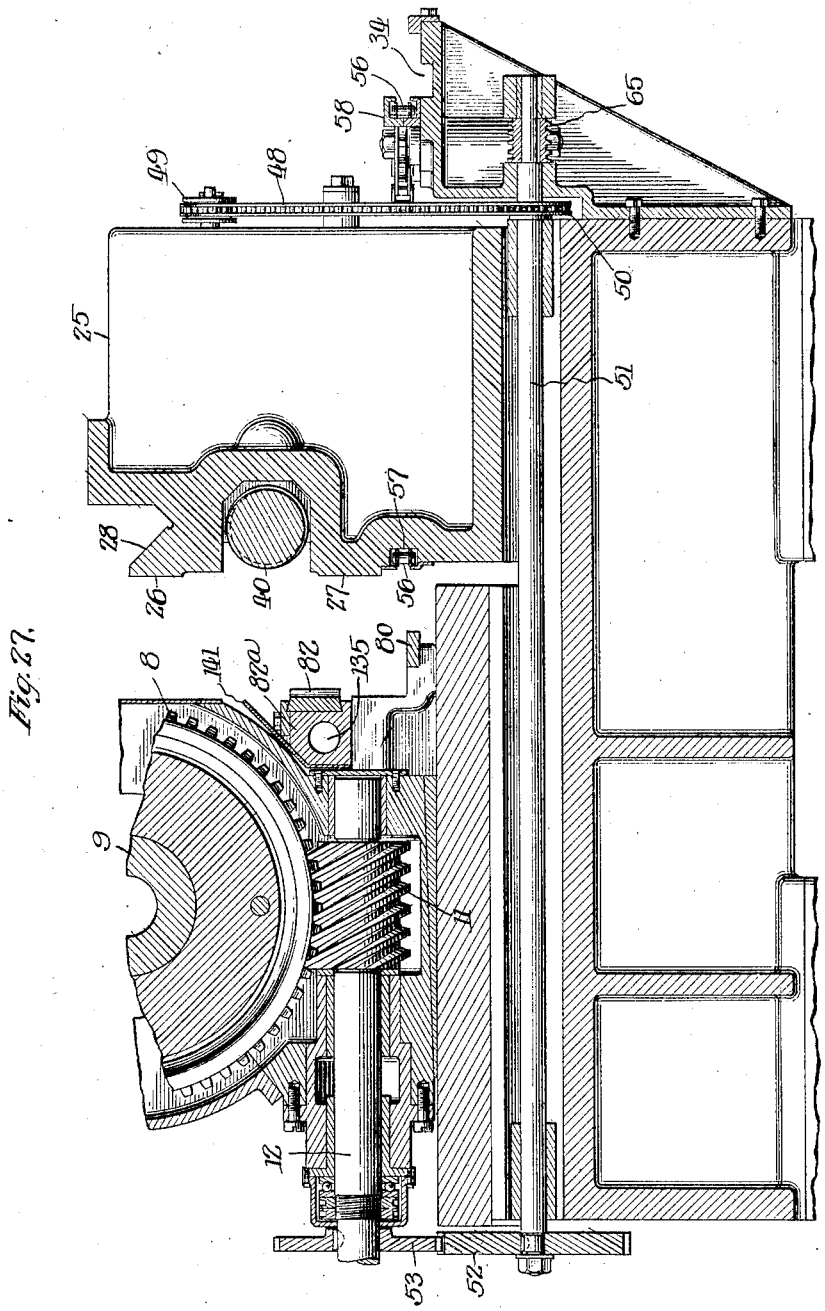

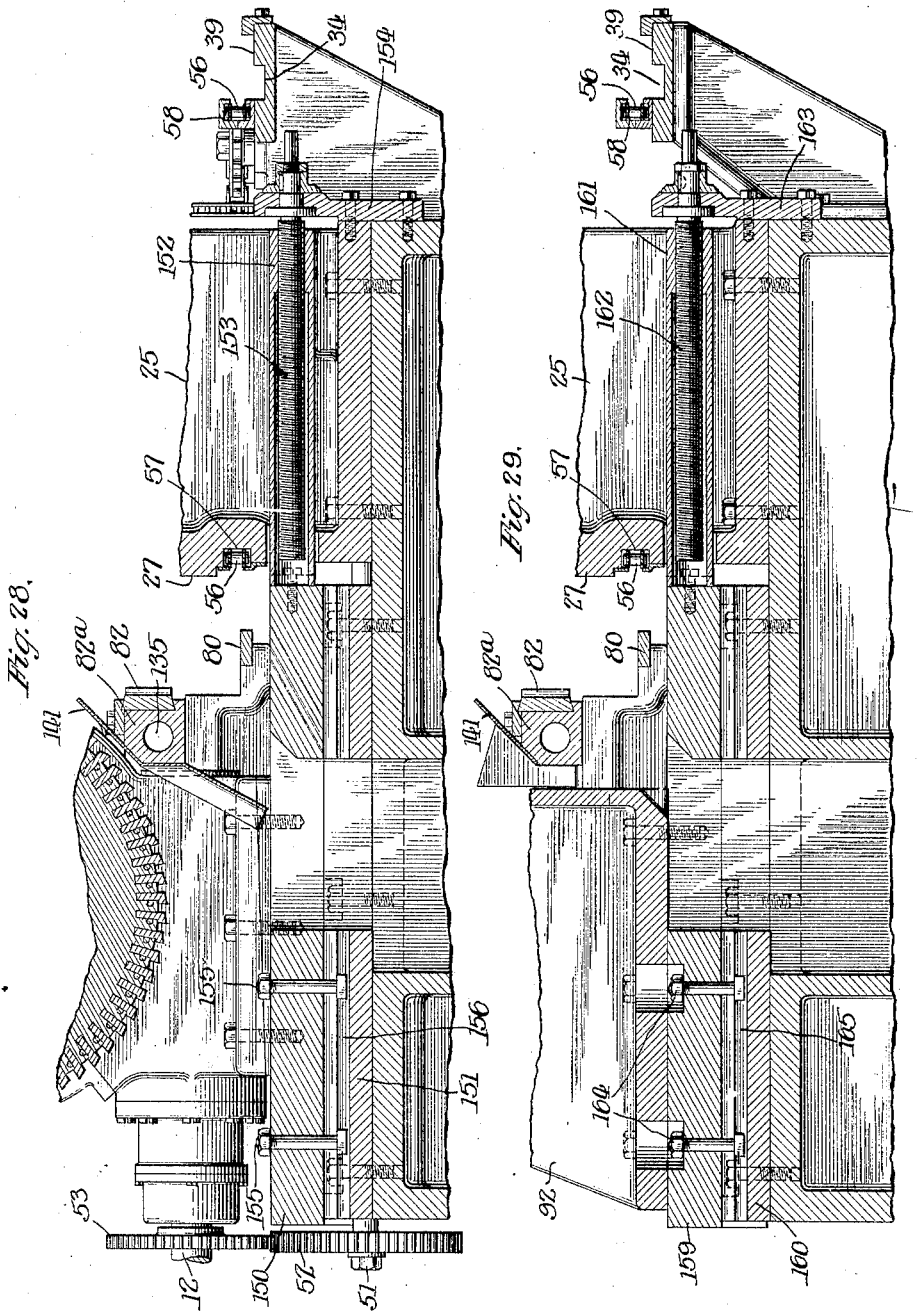

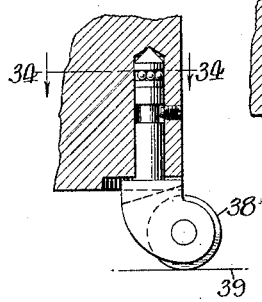
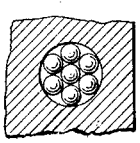
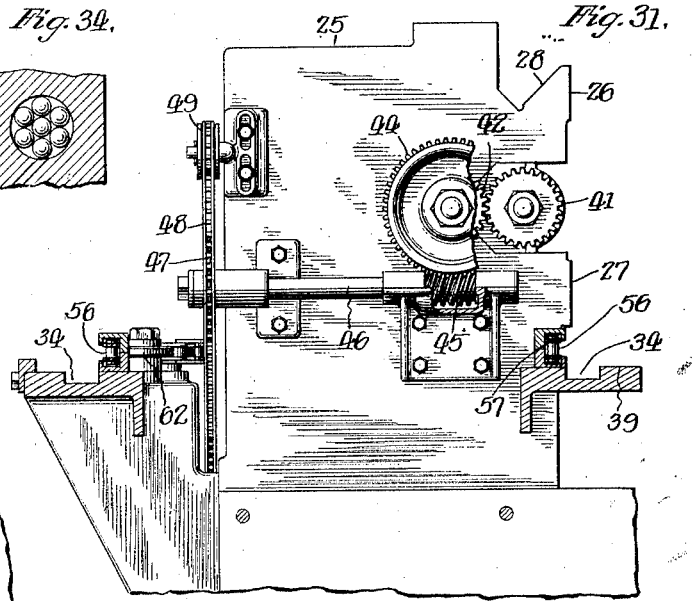
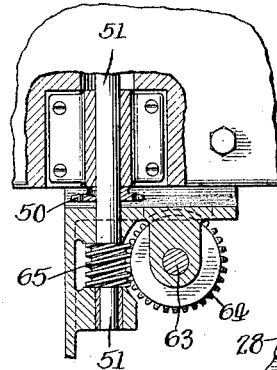
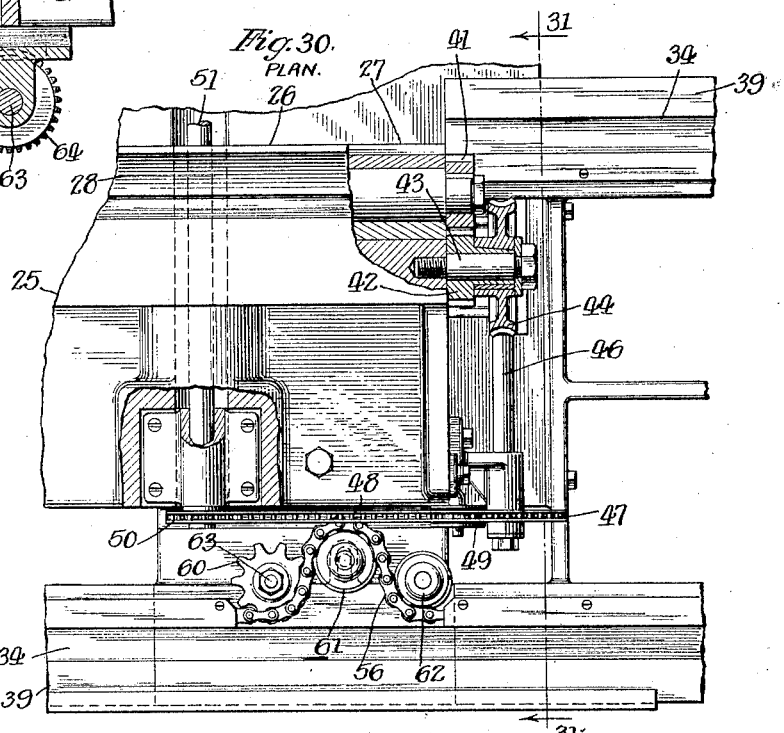

Patented May 7, 1929.

1,712,256

UNITED STATES PATENT OFFICE.

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS.

GEAR-CUTTING MACHINE.

Application filed August 8, 1924, Serial No. 730,839. Renewed December 3, 1928.

The object of this invention, generally stated, is to reduce the cost of manufacturing gear wheels, sprocket wheels, and similar toothed bodies of revolution, by providing a machine capable of generating the teeth of such gears with relatively great rapidity and a high degree of accuracy.

A particular object of the invention is to provide a machine wherein the gears may be both roughed out and finished with one setting of the blanks upon their supports, thus obviating the inaccuracies which are practically inevitable when a blank is transferred from the arbor on which it is supported during the roughing operation to another arbor for the finishing operation.

Another object is to prevent the introduction of inaccuracies in the work due to expansion caused by the heat generated in the cutting operation.

A further object is to provide a circulatory series of blank supports arranged to travel from a loading and unloading station to and past the cutting means and thence back to the loading and unloading station.

In the machine herein shown the work supports travel at a higher rate of speed while moving to and away from the cutters than while traveling past the cutters. It is an object of this invention to provide means whereby a work support, when moving to the cutters, shall be prevented from striking the work supports passing the cutters, thereby preventing vibration which would cause marks to be left on the work by the finishing cutter.

Various other objects and advantages of this invention will become apparent as the description proceeds.

In the accompanying drawings, Figure 1 is a plan view of a machine embodying the features of this invention.

Fig. 2 is an elevation of the loading side of the machine.

Fig. 3 is an elevation of the opposite side of the machine.

Fig. 4 is a view of the roughing end of the machine.

Fig. 5 illustrates the finishing end of the machine.

Fig. 6 is a fragmental plan view of the gear-roughing mechanism, the chip guards 140 and 141 being omitted.

Fig. 7 is a horizontal sectional view showing more particularly the means for spacing the cars or work supports to prevent the transmission of shocks to the work in process of being finished. In Fig. 7, the right-hand car is represented as having been arrested.

Figs. 10, 11 and 12 are, respectively, a side elevation, a plan view and an end view of the finishing mechanism.

Fig. 13 is a horizontal plan section taken in the planes indicated by the dotted line 13—13 of Fig. 5.

Figure 8:
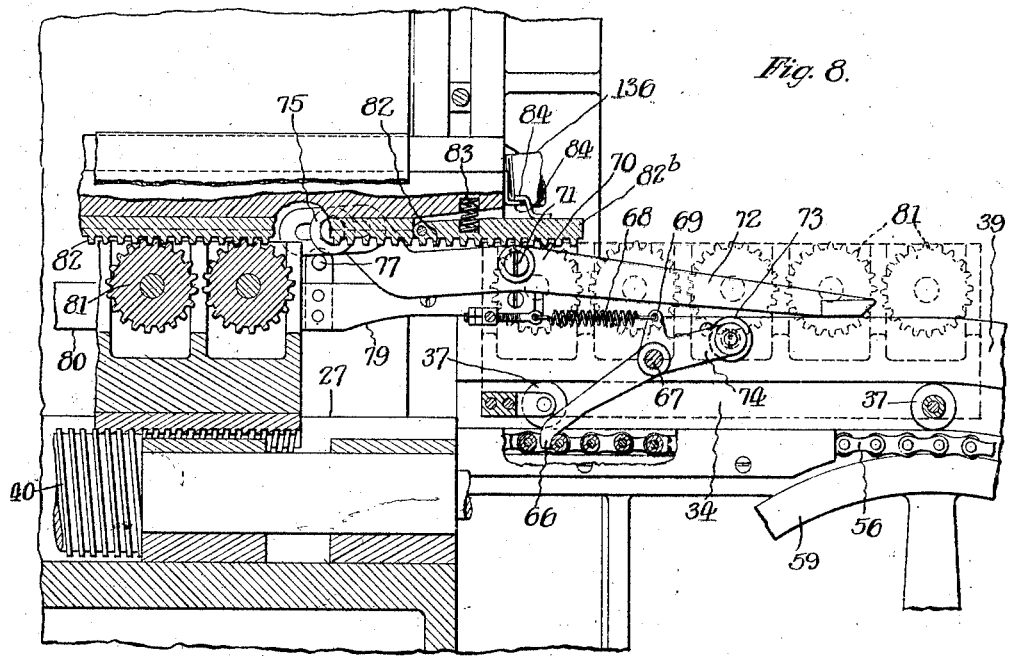
Fig. 8 is a view similar to that of Fig. 7 but showing the last-mentioned car as having been released.

Figs. 14, 15 and 16 illustrate the backlash preventing means, Figs. 14 and 15 being sectional views taken in the planes of lines 14—14 and 15—15, respectively, of Fig. 25.

Fig. 17 is a horizontal view taken in the plane of line 17—17 of Fig. 5. The chip guards 140 and 141 are omitted in this view.

Fig. 18 is an underside view of the finishing mechanism.

Fig. 19 is a detail view of the planing cutter and its support.

Fig. 20 is a vertical sectional view of the finishing mechanism taken in the plane of line 20—20 of Fig. 10.

Fig. 21 is a fragmental view showing the parts in the position occupied in Fig. 20.

Fig. 22 is a detail view of the finishing cutter and its support.

Fig. 23 is a view similar to that of Fig. 20 but showing the parts in a different position.

Fig. 24 shows the mechanism for withdrawing the finishing cutter out of contact with the work during its return stroke.

Fig. 25 is a vertical sectional view showing both the roughing cutter and the finishing cutter, and illustrating also the master gearing.

Fig. 26 is a fragmental vertical view of the finishing mechanism.

Fig. 27 is a fragmental transverse vertical sectional view through the machine, showing the means for driving the roughing cutter and the screw by means of which the work-supporting cars are caused to pass the cutter.

Fig. 28 is a fragmental vertical sectional view showing the means for adjusting the roughing cutter.

Fig. 29 illustrates the means for adjusting the finishing cutter.

Fig. 30 is a fragmental plan view showing the means for driving the screw which advances the cars past the cutters and the means for driving the chain which picks up the cars after they leave said screw and moves them to the loading and unloading station, and thence back to the head end of the screw.

Fig. 31 is an end elevation taken in the plane of line 31—31 of Fig. 30.

Fig. 32 is a fragmental plan view showing the means for driving the before-mentioned chain.

Fig. 33 illustrates one of the casters with which each car is provided.

Fig. 34 is a sectional view in the plane of line 34—34 of Fig. 33, showing the roller bearing for said caster.

The embodiment which has been selected to illustrate the invention comprises a milling cutter 1 having upon its periphery a plurality of equi-distant annular series of cutter teeth 2 of rack-tooth form, the length of the cutter being at least equal to the circumference of the pitch circle of the gears to be formed; a planing cutter 3 of rack-tooth form for finishing the gear teeth roughed out by the cutter 1; a series of slides or cars 4 to support the gear blanks; means to move the cars in an endless circuit to transport the blanks from a loading and unloading station, past the roughing cutter 1 and the finishing cutter 3, back to the loading and unloading station; and means to cause the blanks to revolve as they pass the milling cutter and the planing cutter. I also contemplate placing between the roughing cutter 1 and the finishing cutter 3 a mechanism for rounding the corners of the teeth of the gears, in which event the roughing and finishing cutters would, of course, be spaced farther apart than as herein shown.

The diameter of the cutter 1 is made so great in comparison with the thickness of the blank to be roughed out that the concaving of the bottom of the tooth spaces and the sides of the teeth shall be very slight. In the disclosed embodiment of the invention, the ratio of the thickness of the blank to the radius of the cutter is 1 to 16.

While the cutter 1 may be constructed in various ways, I have herein shown the body of the cutter as formed of three transverse sections or rings 5 (Fig. 6) rigidly secured together. The periphery of each section 5 is provided with slots 6 (Fig. 25) to receive blades 7, each of which blades carries a plurality of cutter teeth 2. The blades 7 may be secured in the slots 6 in any preferred manner. In order to make the strains due to the cutting action more nearly uniform the blades 7 upon one section may be arranged in different angular relation from those on adjacent sections, as shown in Fig. 6. Rigidly secured to the cutter 1 is a worm wheel 8 (Fig. 27). The cutter and the worm wheel are mounted upon a shaft 9 which is carried in brackets 10 (Figs. 1 and 4). The worm wheel 8 meshes with a worm 11 (Fig. 27) fixed upon a shaft 12, which shaft may be driven in any suitable way, as, for example, by means of a belt 13 (Fig. 2) running over a pulley 14 fixed on said shaft.

The blanks are indicated at $b$ (Fig. 1). Each blank is rigidly secured to an arbor $c$ (Fig. 25) by means of which the blank is supported during the roughing and finishing operations and during its travel in the machine, and through which rolling movement is imparted to the blank while it is passing the cutters. Inasmuch as the length of the cutter 1 is at least equal to the circumference of the pitch circle of the gear to be cut, it is possible for the cutter to operate upon at least three blanks at the same time.

The blanks may be caused to travel past the cutters by any suitable means, the preferred means including a plurality of cars 4 (Fig. 25). Herein each car is shown as carrying five arbors $c$. Each arbor is rotatably mounted in a bearing 15 in the car, the lower end of the arbor being supported on a thrust bearing 16. The upper end of the arbor is reduced in diameter to receive the blank $b$, the latter being clamped against a shoulder or flange 17 on the arbor by means of a nut 18 and a washer 19.

There may be any suitable provision for conveniently and rapidly removing the blank from the arbor. Herein is shown an ejector plunger 20 (Fig. 25) extending axially of the arbor, the lower end of the plunger being accessible to an automatic mechanism (not shown) or to a tool in the hands of a workman for driving the plunger upwardly. Downward movement of the plunger is limited by engagement of an annular shoulder 21 on the plunger with the screw-plug 22 that carries the thrust bearing 16. Pressure is transmitted from the plunger 20 to the blank by means of a plurality of rods 23, a washer 24 being interposed between said rods and the hub of the blank.

The means for supporting and guiding the cars 4 while passing the roughing cutter and the finishing cutter comprises a massive casting 25, (Figs. 1, 2 and 27) extending parallel with the axis of the cutter 1 and providing upon the side which is adjacent to the cutters two vertical parallel guiding surfaces 26 and 27 and a guiding surface 28 parallel with, adjacent to, but inclined away from the surface 26. The car is provided with bearing surfaces 29 and 30 (Fig. 25) to slide in contact with the surfaces 26 and 27, respectively; and at the upper portion of the car is a rearwardly extending flange 31 having an inclined surface 32 adapted to engage the surface 28 and thus support the car. The inclination of the surfaces 28 and 32 is such that gravity holds the car in contact with the vertical surfaces 26 and 27.

After passing off the guides 26, 27 and 28 and while returning to said guides, the cars are guided by means of two tracks 33 and 34 (Figs. 1, 25 and 31) which are channel-shape in cross-section. The upper track 33 is endless, but the lower track 34 begins at the exit end of the guides and terminates at the entrance end of said guides (see Fig. 30). Each car has two rollers 35 (Fig. 6) to run in the upper track 33 and two rollers 37 (Fig. 8) to travel in the lower track 34. Each car also has two casters 38 (Figs. 2 and 33) adapted to run on the track 39 (Fig. 1) and thus carry the weight of the car. The track 39 begins at the exit end of the guides 26, 27 and 28 (see Fig. 1) and terminates at the point where the cars enter upon said guides, as shown in Fig. 7.

The means for causing the cars to travel past the cutters comprises a screw 40 (Fig. 7) extending longitudinally of and between the guides 26 and 27, and from a point in advance of the roughing cutter 1 to a point beyond the finishing cutter 3. The screw 40 may be driven in any preferred manner, as, for example, by means of a pinion 41 (Fig. 31) fixed to said screw and meshing with a pinion 42 mounted on a stud 43. Rigid with the pinion 42 is a worm wheel 44 that meshes with a worm 45 on a shaft 46. Fast on the shaft 46 is a sprocket wheel 47 (Fig. 2) which is driven by a chain 48 extending over an idler 49 and a driving sprocket wheel 50. The sprocket wheel 50 is fixed upon a shaft 51 (Fig. 27) which is driven from the shaft 12 through gears 52 and 53.

Each car carries a rack or a segment of a nut 54 (Fig. 7) adapted to mesh with the screw 40. Preferably the leading end of the rack 54 comprises a yieldable section 55 which is mounted on the car for movement transversely of the axis of the screw. If, as the car approaches the end of the screw, the thread of the latter should engage the top of the leading tooth of the rack section 55, the rack section will yield or move away from the screw. As the car continues to advance, the rack section will presently spring into proper engagement with the screw.

The means for propelling the cars 4 after they have left the screw 40 and for returning the cars to said screw comprises an endless chain 56 (Fig. 28) arranged to run within a guide channel 57 below the guide surface 27 and within a guide channel 58 parallel with the channel 57. The chain 56 is arranged to run around two idler sprocket wheels 59 (Fig. 1) with which the guide channels 57 and 58 are tangential, and around a driving sprocket wheel 60 (Fig. 30) and two small idlers 61 and 62, the idler 61 being adjustable to take up slack. The sprocket wheel 60 is secured to a shaft 63 carrying a worm wheel 64 (Fig. 32) which meshes with a worm 65 on the shaft 51.

Each car is releasably connected to the chain 56 by means of a hook 66 (Fig. 8) which is pivoted to the car at 67. The hook is urged into position to engage the chain by means of a tension spring 68 anchored to the car and connected to a crank arm 69 which is rigid with the hook 66.

The movement imparted to the cars 4 by the chain 56 is much faster than that produced by the screw 40, and enough cars are provided so that a practically uninterrupted line of cars shall always be passing the cutters 1 and 3, to the end that the cutters shall be continually operating on the largest possible number of blanks. If the cars that are passing the cutters were in contact with one another, and the cars brought successively to the head of the line by the chain 56 were permitted to strike the line of cars, the vibration thus imparted through the cars might cause marks to be left upon the gears which were being finished by the cutter 3 at the moment of impact. I, therefore, provide means to insure the spacing of the cars a slight distance while passing the cutters. This means comprises a lever 70 (Fig. 8) which is pivoted at 71 in the framework of the machine near the entrance to the guides 26, 27 and 28. One arm 72 of this lever constitutes a feeler adapted to engage a roller 73 on an arm 74 which is rigid with the hook 66. The other arm of the lever 70 carries a roller 75 (Figs. 8 and 9) adapted to run in contact with the surface 76 (Fig. 9) of successive cars 4. When the roller 75 is in engagement with a car 4, as in Figs. 7 and 9, the feeler 72 is held in such position as to engage the roller 73 of any car which may approach the head of the line, and thus swing the hook 66 of such approaching car out of engagement with the chain 56, whereby movement of such approaching car is arrested. As soon as the car which is in engagement with the roller 75 passes away from said roller, the spring 68 on the car waiting to enter the line places the hook 66 in engagement with the continuously moving chain 56, whereupon the car is advanced by the chain until the rack-section 55 engages the screw 40. 77 (Fig. 8) is a stop pin to limit movement of the lever 70 in one direction under the action of the spring 68. The mechanism is so arranged and timed that the enforced pause which normally occurs in the travel of the cars is sufficient to insure a slight space between successive cars while the latter are passing the cutters, as indicated at 78 in Figs. 7 and 17. The hook 66 is sufficiently shallow so that when the rack engages the screw the chain 56 slips by the hook. Shortly after the nut has engaged the feed screw, the hook 66 is withdrawn from the chain 56 by means of a cam 79 (Fig. 8) fixed in the framework of the machine, the cam 79 being succeeded by a straight bar or dwell 80. Just before the car passes out of engagement with the screw 40, the bar 80 (Fig. 17) allows the hook 66 to swing into position to be engaged by the chain 56, whereupon the car is moved around to the loading station.

Figure 9:
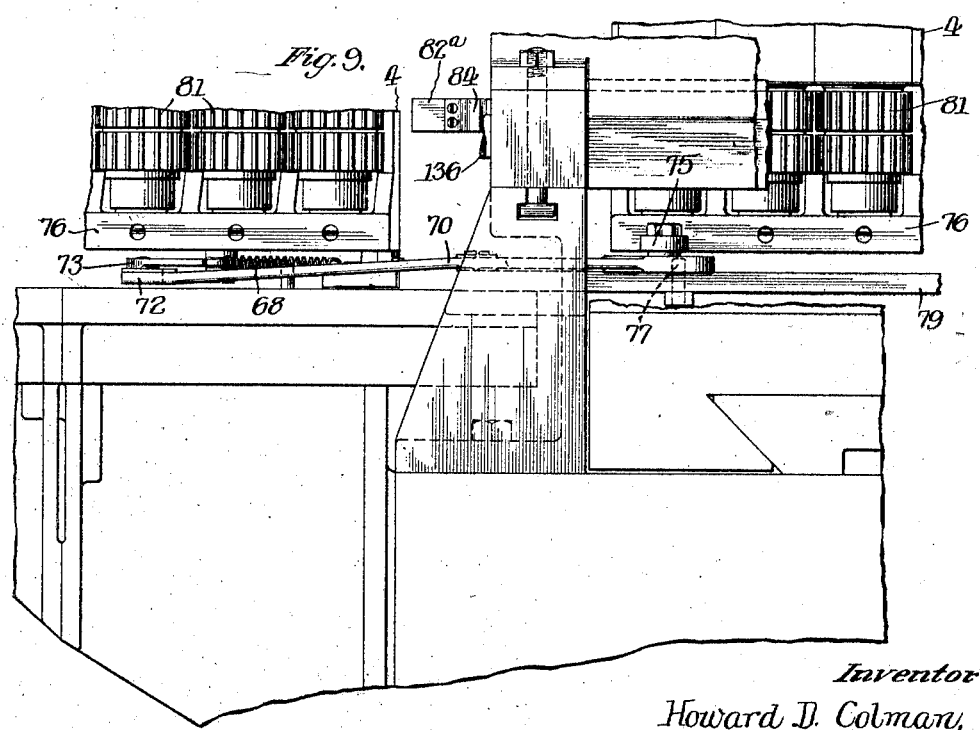
Fig. 9 is a fragmental elevation, with the parts in the position shown in Fig. 7.

The means for rolling the blanks past the cutters 1 and 3 includes a master gear wheel fixed with relation to each blank and arranged to mesh with a stationary master rack, the master gears being of the same pitch diameter as the gears to be formed, and the master rack being similar to the imaginary racks constituted by the cutters. Upon reference to Fig. 25, it will be noted that a master pinion 81 is formed integral with each arbor $c$ in position to mesh with a master rack 82. Said rack is secured to a bar 82$^a$ stationarily mounted in the framework of the machine below the cutters, and extends from a point in advance of the roughing cutter 1 to a point beyond the finishing cutter 3, as indicated in Figs. 8 and 17. Preferably at the end of the master rack which is first engaged by the master pinion is made yieldable, as shown in Figs. 8 and 9. The rack section 82$^b$ is pivoted to the remainder of the rack (Fig. 8) and is normally held forward by an expansive spring 83 to the extent permitted by interengaging stops 84 on said rack-section and the stationary framework. If a tooth of an approaching master pinion engages the end of the first tooth on the rack-section 82$^b$, said section yields and springs into engagement with the master pinion as soon as the pinion teeth are in position to mesh with the rack.

As the car travels past the cutter 1, the master pinion 81 meshing with the stationary master rack 82 causes the blank to revolve or roll over the periphery of the cutter, whereby gear teeth are generated on the periphery of the blank. The blank is similarly caused to roll past the finishing cutter 3, whereby the gear teeth roughed-out by the cutter 1 are reduced to finished dimensions, as will appear more fully hereinafter.

Back-lash or loose engagement between the master rack and the master pinions would introduce inaccuracies in the work. I therefore provide means for preventing back-lash, which means, in the present embodiment, is constructed and arranged as follows:

Referring to Fig. 25, a false pinion 85 is pivotally mounted upon each arbor $c$ below the master pinion 81, both pinions being of the same circular pitch and pitch diameter. Just below the pinion 81 the arbor is provided with a cylindrical portion 86 which extends into a recess in the false pinion 85 and serves to hold the pinions in axial alinement. The master rack 82 is wide enough to mesh with both pinions 81 and 85. The false pinion is chambered to receive a curved leaf spring 87 (Fig. 16), one end of said spring lying in a notch 88 (Fig. 14) in the pinion 85, and the other end of the spring lying in a notch 89 in the arbor. Upon reference to Figs. 14 and 15 it will be seen that the spring 87 holds the teeth of the master pinion 81 pressed against the rear side of the master rack teeth (having reference to the direction of the travel of the cars 4), and that said spring holds the teeth of the false pinion 85 pressed against the forward side of the master rack teeth, thus preventing play or looseness between the master pinion and the master rack. When the pinions 81 and 85 are not in mesh with the master rack, the extent to which the spring 87 may hold the teeth of one pinion out of register with the teeth of the other is limited by the interengagement of projections 90 and 91 on the arbor and the pinion 85 respectively.

The finishing cutter is supported upon a column 92 (Figs. 1, 2 and 5). A slide or ram 93 is guided to reciprocate vertically upon the column. The means herein shown for reciprocating the ram 93 comprises a shaft 94 supported in bearings 95 at the upper end of the column 92 and driven by means of a belt 96 and pulley 97. The shaft 94 is provided with two cranks 98 (Fig. 26) which are connected by means of rods 99 to eccentric or cranked portions 100 of a shaft 101. The shaft 101 is rigidly secured to the ram 93 by means of four clamps 102. Centrally of the shaft 101 is a flange 103 having a peripheral series of holes 104 to receive an implement for turning the shaft 101 to raise and lower the ram 93 with reference to its driving means to correspond with the thickness of the blanks operated on, and to lower the ram to compensate for reduction in thickness of the planer tool due to resharpening.

The cutter 3 is in the nature of a planer tool of rack-tooth contour, the length of the planer tool being equal to the circumference of the pitch circle of the gears to be formed. In the construction shown (Figs 19 and 22), the planer tool consists of three sections 3$^a$ arranged end to end, said sections having shanks 3$^b$ which fit within the holder 105. The cutter is secured in the holder 105 by means of a clamping screw 106.

In order that the planer tool 3 may be withdrawn rearwardly away from the gear blanks so as to be out of contact with the work during the upward stroke of the planer tool, the latter is mounted upon the ram 93 in the manner to be now described. The holder 105 is mounted within an opening 107 in a bracket 108, and is rigidly secured to the bracket by means of clamp screws 109. The bracket 108 comprises a plurality of alined bearings 110 to receive eccentric portions 111 (Figs. 18, 20 and 26) of a shaft 112. The shaft 112 is mounted in bearings 113 on the ram 93. The end of the bracket or tool holder 108 which carries the planer tool 3 is connected to the ram by means of a vertically disposed plate 114. The eccentric shaft 112 is arranged to move the planer tool 3 into and out of cutting position by means including a crank arm 115 (Figs. 24 and 26) fixed to one end of said shaft and having a crank pin 116 on one end of which a link 117 is pivoted. The other end of the link is pivoted on a crank pin 118 carried by a crank arm 119, which is pivoted on the ram 93 at 120. The crank arm 119 carries a pin 121 on which is mounted a block 122 (Figs. 18 and 26). The block 122 is slidably mounted in a guideway 123 formed in the lower arm of a lever 124. The lever 124 is pivoted on the ram 93 on the axis 125. The upper arm of the lever 124 carries a roller 126 (Fig. 26) which runs in the groove 127 of the cam 128. The cam 128 is fixed upon the shaft 94.

In the rotation of the shaft 94, the ram 93 is rapidly moved up and down to impart the cutting and return movements to the planer tool 3. The blanks roll past the planer tool 3 while the latter is being rapidly reciprocated, whereby the gear teeth are planed to the proper form and dimensions. Referring to Fig. 20, it will be seen that while the planer tool is making its cutting stroke the guideway 123 in the lever 124 is in vertical position or, in other words, parallel with the direction of movement of the ram 93, the roller 126 being then in the concentric or dwell portion of the cam groove 127. The eccentric shaft 112 is, therefore, held against pivotal movement, consequently the planer tool 3 is held stationary with reference to the ram.

Referring now to Fig. 23: Upon the completion of the cutting stroke, the crank shaft 94 begins to raise the ram, and the roller 126 enters the cam portion of the groove 127, thereby imparting a slight pivotal movement to the eccentric shaft 112 in the direction to withdraw the planer tool from contact with the work.

Upon reference to Figs. 23 and 24, it will be noted that the eccentric 111 is so positioned with relation to the bracket 108 as to impart to said bracket a movement requiring a bending of the plate 114 in practically only one direction, thus subjecting said plate to minimum stress in the movements of the tool into and out of cutting position. As shown in Fig. 20, the plate 114 extends parallel with the direction of movement of the ram 93 during the cutting stroke and thus is favorably positioned to resist the pressure of the work against the tool.

The described means for mounting the finishing cutter 3, including the plate 114 which is flexed to withdraw the cutter, say, fifteen thousandths of an inch, from the work before the upstroke begins, is employed to reduce the number of joints, as joints introduce looseness or play, and looseness precludes the attainment of accuracy in the work.

Considerable heat is generated in the operation of the cutters. If the finishing cutter and the blanks were permitted to become more than a few degrees hotter than the master gearing, the greater expansion of the finishing cutter and the blanks as compared with the expansion of the master gearing would prevent the attainment of the necessary degree of accuracy of the work. It is important, therefore, that the cutters, blanks and master gearing shall be as nearly of the same temperature as possible. This result is obtained in the present embodiment of the invention by circulating the coolant through the master rack so as to heat the master rack and master pinions to approximately the same temperature as the cutters and the work. The coolant-circulating system will be best understood by reference to Figs. 1 to 5. 129 is a coolant-circulating pump driven by a belt 130 and a pulley 131. The suction side of the pump 129 is connected to a coolant reservoir 132 by means of a pipe 133 (Fig. 5). To the delivery side of the pump is connected a pipe 134 which is connected to one end of the bar 82$^a$ that supports the master rack 82. As shown in Fig. 25, the rack-supporting bar is provided with a longitudinal duct 135 through which the coolant flows. To the other end of the bar 82$^a$ is connected a pipe 136 (Fig. 6) leading to a by-pass valve 137 (Fig. 3) which delivers any desired portion of the coolant through a pipe 138, and returns the remainder to the reservoir 132 through a pipe 139. The pipe 138 extends along the upper portion of the machine in position to discharge the coolant upon the milling cutter 1, the planing cutter 3 and the blanks. The chip-laden coolant is kept away from the master rack and the master pinions by suitable means, as, for example, co-acting shields 140 and 141 fixed to the cars 4 and the rack bar, respectively, the shield 140 directing the coolant through passages in the framework which conduct the coolant to a strainer 142, whence it flows to the reservoir 132.

The loading station is illustrated in Figs. 1 and 2. Suitable means is provided for arresting the travel of a car as it reaches the loading station. The means herein shown for this purpose includes a cam 142$^a$ attached to the edge of the track in position to be engaged by the roller 73 on the hook 66 and thus disengage the hook from the chain; and a stop 143 (Fig. 2) which is pivoted to the stationary framework at 144 and has a notched end adapted to be placed by the operator in the path of travel of the cars. When a car strikes the stop 143 its movement is arrested, the hook 66 being held away from the chain 56 by said cam 142$^a$. Reverse movement of the car is prevented by a similar stop 145 pivoted at 146. 147 is a rack having a yieldable forward end, said rack being arranged in position to mesh with the false pinions 85 while a car is at the loading station. The arbors are thus held against rotation while the operator is replacing the finished gears with blanks $b$. After the car has been loaded the operator releases it from the stops 143 and 145 and pushes the car across the gap caused by the passage of the chain around the sprocket 60 and the idlers 61 and 62 until the hook 66 is again picked up by the chain 56.

Inasmuch as the cutters 1 and 3 are provided with relief, it is necessary to adjust the cutters toward the work after resharpening. The roughing cutter 1 is supported upon a slide 150 (Figs. 1, 3 and 4) which is mounted on a guide 151 on the bed of the machine. To one end of the slide 150 is secured a nut 152 (Fig. 28) which is engaged by a screw 153. The latter is rotatably mounted in a bracket 154 and has a squared end to receive a crank (not shown). The slide 150 is secured in adjusted position by means of clamping bolts 155 carried by the slide and engaging a T-slot 156 in the guide 151. The brackets 10 (Fig. 4) are adjustably connected to the casting 25 by means of two stay bars 157 and clamps 158 (Figs. 1 and 6).

The column 92 is rigidly secured to a slide 159 (Figs. 3 and 29) which is mounted on a guide 160 on the machine bed. To one end of the slide 159 is attached a nut 161 engaging a screw 162 which is carried by a bracket 163. The outer end of the screw 162 is squared for engagement by a crank (not shown). After adjustment the slide 159 is secured in place by means of clamping screws 164 carried by the slide and engaging a T-slot 165 in the guide 160. The upper end of the column 92 is adjustably secured to the casting 25 by means of a bracket 166 (Figs. 1, 2 and 5) and clamps 167.

The means just described for adjusting the cutter-supports provide for sufficient adjustment to permit of the production of gears of various diameters.

The machine herein shown is capable of cutting gears very much faster than any other type of gear cutting machine of which I am aware. It is very simple in construction; the roughing cutter 1 has no movement except that of rotation; the finishing cutter 3 has no movement except reciprocation save for the slight retraction to prevent dragging the cutter over the work on the return stroke; and by reason of the great width and diameter of the cutter 1 and the length of the cutter 3 the blank need be given only a rolling movement. Because of the large number of teeth with which it is provided, the cutter 1 may be operated for a relatively long time without resharpening.

Although it is advantageous to circulate the arbors, as herein shown, the invention may be profitably embodied in a machine wherein the arbors are reciprocated back and forth past the cutters. It will be understood that the direction in which the blanks pass the cutters is immaterial.

The roughing out and finishing of the gears with one setting of the blanks on their arbors makes for rapidity of production and a high degree of accuracy. Inasmuch as there is no variation in the location of the blank on its spindle when finishing from that when roughing, the gear may be roughed out more nearly to final dimensions by means of the cutter 1, thus reducing the amount of stock to be removed by the finishing cutter and thereby lengthening the life of the latter. There are very few teeth on the finishing cutter as compared with the roughing cutter, hence the importance of lessening the necessity for resharpening.

For the sake of brevity the term "gear" has been used in the following claims to denote a gear wheel, sprocket wheel or similar article.

I claim as my invention:

1. A gear-cutting machine having, in combination, a cutter having upon its periphery a plurality of annular series of cutter teeth of rack-tooth form, the length of the cutter being at least equal to the circumference of the pitch circle of the gear wheel to be formed, the ratio of the thickness of the gear wheel to the radius of the cutter being so great that the concaving of the sides of the teeth and the bottoms of the tooth spaces is unobjectionable, a guide extending parallel with the axis of the cutter and located opposite the periphery thereof, a screw adjacent to and extending parallel with said guide, a slide adapted to move on said guide and having a rack adapted to be engaged by said screw, an arbor on said slide for supporting a blank in position to be rolled across the periphery of the cutter, a master rack extending parallel with said guide, a master pinion on said arbor arranged to mesh with said master rack, an endless chain, a portion of which extends in proximity to said guide, a hook on said slide adapted to engage said chain, and means for causing said chain to travel.

2. A gear-cutting machine having, in combination, a supporting framework, a reciprocatory ram on said framework, a tool-holder movably supported on the ram, a planer tool carried by said holder, a flexible plate connecting said holder with said ram, said plate normally extending parallel with the direction of reciprocation of the ram, a lever pivoted intermediate its ends on said framework, a cam engaging one arm of said lever to swing the latter, the other arm of said lever having a straight guideway therein, and means for moving said tool-holder including a block slidable in said guideway.

3. A gear-cutting machine having, in combination, a supporting framework, a reciprocatory ram on said framework, a tool holder movably supported on the ram, a planer tool carried by said holder, a lever pivoted intermediate its ends on said framework, a cam engaging one arm of said lever to swing the latter, the other arm of said lever having a straight guideway therein, and means for moving said tool-holder including a block slidable in said guideway.

4. A gear-cutting machine having, in combination, a cutter having upon its periphery a plurality of annular series of cutter teeth of rack-tooth form, the length of the cutter being at least equal to the circumference of the pitch circle of the gear wheel to be formed, the ratio of the thickness of the gear wheel to the radius of the cutter being so great that the concaving of the sides of the teeth and the bottoms of the tooth spaces is unobjectionable, a guide extending parallel with the axis of the cutter, a car mounted to slide on said guide, an arbor on the car to support the blank to be cut, a stationary rack extending parallel with said guide, and a master pinion fixed to said arbor and meshing with said rack.

5. A gear-generating machine having, in combination, a generating cutter, means including master gearing to cause a gear to roll past the cutter, and means to keep the cutter and the master gearing at approximately the same temperature.

6. A gear-cutting machine having, in combination, a cutter having upon its periphery a plurality of annular series of cutter teeth of rack-tooth form, the length of the cutter being at least equal to the circumference of the pitch circle of the gear wheel to be formed, the ratio of the thickness of the gear wheel to the radius of the cutter being so great that the concaving of the sides of the teeth and the bottoms of the tooth spaces is unobjectionable, a plurality of arbors for supporting such gear blanks, means for circulating the arbors past the periphery of said cutter, and means for imparting rotation to the blanks as they travel past the cutter longitudinally of the axis of the cutter.

7. A gear-cutting machine having, in combination, a cutter mounted upon a stationary axis and having upon its periphery a plurality of annular series of cutter teeth of rack-tooth form, the length of the cutter being at least equal to the circumference of the pitch circle of the gear wheel to be formed, the ratio of the thickness of the gear blank to the radius of the cutter being so great that the concaving of the sides of the teeth and the bottoms of the tooth spaces is unobjectionable, and means for rolling such a blank across the periphery of the cutter longitudinally of the axis of the cutter.

8. A gear-generating machine having, in combination, a rotary roughing cutter having upon its periphery a plurality of annular series of cutter teeth of rack-tooth form, the length of the cutter being at least equal to the circumference of the pitch circle of the gear wheel to be formed, the ratio of the thickness of the gear wheel to the radius of the cutter being so great that the concaving of the sides of the teeth and the bottoms of the tooth spaces is unobjectionable, a reciprocatory planer tool of rack-tooth contour for finishing a gear wheel which has been roughed out very nearly to final dimensions by the first-mentioned cutter, the length of the planer tool being equal to the circumference of the pitch circle of the gear wheel to be finished, and a blank-supporting arbor for rolling a blank past said cutters in succession whereby the blank is roughed out and finished with one setting of the blank on said arbor.

9. A gear-finishing machine having, in combination, a reciprocatory ram, an eccentric shaft on said ram, a bracket engaged by the eccentric portion of said shaft, a planer tool carried by said bracket, a flexible plate connecting said bracket to said ram, said plate normally extending parallel with the direction of reciprocation of the ram, and means for operating said eccentric shaft, said means being arranged to hold the shaft stationary with reference to the ram during the cutting stroke and to rock said shaft prior to the commencement of the return stroke to retract the tool from contact with the work.

10. A gear-finishing machine having, in combination, a reciprocatory ram, a tool support movably mounted on said ram, a planer tool carried by said support, a flexible plate connecting said support to said ram, said plate normally extending parallel with the direction of reciprocation of the ram, and means to hold the support stationary with reference to the ram during the cutting stroke and to move said support prior to the commencement of the return stroke to retract the tool from contact with the work.

11. A gear-finishing machine having, in combination, a reciprocatory ram, an eccentric shaft on said ram, a bracket connected to said ram and engaged by the eccentric portion of said shaft, a planer tool carried by said bracket, and means for operating said eccentric shaft, said means being arranged to hold the shaft stationary with reference to the ram during the cutting stroke and to rock said shaft prior to the commencement of the return stroke to retract the tool from contact with the work.

12. A machine tool having, in combination, a metal-working mechanism, a series of work supports, means to cause the work supports to travel past the metal-working mechanism at relatively low speed, means operating at relatively high speed to return the work supports to the first mentioned means, and means to prevent one work support from striking another while the latter is passing said metal-working mechanism.

13. A machine tool having, in combination, a metal-working mechanism, a series of work supports, means to cause the work supports to travel past the metal-working mechanism at relatively low speed, means operating at relatively high speed to return the work supports to the first mentioned means, and means to prevent an approaching work support from striking another while the latter is passing said metal-working mechanism comprising a lever one arm of which is arranged to engage the last-mentioned work support, the other arm being arranged to disconnect the approaching work support from said returning means.

14. A machine tool having, in combination, a metal-working mechanism, a series of work supports, a screw to cause the work supports to travel past the metal-working mechanism at relatively low speed, means operating at relatively high speed to advance the work supports to said screw, and means to prevent an approaching work support from striking another while the latter is being moved by said screw.

15. A machine tool having, in combination, a metal-working mechanism, a series of work supports, means to cause the work supports to travel past the metal-working mechanism at relatively low speed, an endless chain moving at relatively high speed to return the work supports to the first mentioned means, and means to prevent an approaching work support from striking another while the latter is passing said metal-working mechanism comprising means arranged to feel for the last-mentioned work support and disconnect the approaching work support from said chain.

16. A gear-finishing machine having, in combination, a finishing cutter, means including a master rack and a master pinion meshing with said rack to cause the gear to roll past the finishing cutter, and coolant-supplying means arranged to discharge coolant upon the cutter and to circulate the coolant through the master rock to maintain said rack at approximately the same temperature as the cutter.

17. A gear-finishing machine having, in combination, a finishing cutter, means including a master rack and a master pinion to cause the gear to roll past the finishing cutter, and means to keep the cutter and the master rack at approximately the same temperature.

18. A planer having, in combination, a reciprocatory ram, a cutter, a plate one end of which is connected to the ram, the opposite end being connected to the cutter, said plate serving to transmit the force of the ram to the cutter, and means for withdrawing the cutter from contact with the work upon the return stroke of the ram.

In testimony whereof, I have hereunto affixed my signature.

HOWARD D. COLMAN.